April 3, 1928. 1,664,680
G. E. A. HALLETT
HYDRAULIC BRAKING SYSTEM FOR MOTOR VEHICLES
Filed June 23, 1925 5 Sheets-Sheet 2

Inventor
Geo. E. A. Hallett
By Spencer Sewall & Hardman
his Attorneys

April 3, 1928. 1,664,680
G. E. A. HALLETT
HYDRAULIC BRAKING SYSTEM FOR MOTOR VEHICLES
Filed June 23, 1925 5 Sheets-Sheet 3

Inventor
Geo. E. A. Hallett
By Spencer Sewall & Hardman
his Attorneys

April 3, 1928.

G. E. A. HALLETT 1,664,680

HYDRAULIC BRAKING SYSTEM FOR MOTOR VEHICLES

Filed June 23, 1925

Inventor
Geo. E. A. Hallett
By Spencer Sewall & Hardman
his Attorneys

Patented Apr. 3, 1928.

1,664,680

UNITED STATES PATENT OFFICE.

GEORGE E. A. HALLETT, OF DAYTON, OHIO, ASSIGNOR TO GENERAL MOTORS RESEARCH CORPORATION, OF DAYTON, OHIO, A CORPORATION OF DELAWARE.

HYDRAULIC BRAKING SYSTEM FOR MOTOR VEHICLES.

Application filed June 23, 1925. Serial No. 39,074.

This invention relates to hydraulic braking systems for vehicles, especially the larger motor vehicles.

An object of this invention is to provide a hydraulic brake system having a servo-pump for supplying the braking power and control means for said servo-pump whereby the operator is enabled to feel the intensity of brake application by the resistance to said control means. It is thus provided that the operator of the manual control means "feels" the brake just as if the braking power was supplied by the operator himself, but the work necessary to be exerted upon the control means may be made as small as desired since the actual braking power is supplied by the servo-pump.

Another object of the invention is to provide an injection device for more suddenly filling the high pressure lines and brake cylinders at the time the operator applies the brakes, whereby a certain lag otherwise present in the application of the brakes is overcome. This lag may be due to any cause which prevents the high pressure lines and brake cylinders from remaining at all times completely filled with oil. Also during the first movement of the brake cylinders a certain volume of oil is pumped into the high pressure lines before the pressure rises to a high value since there is always a certain amount of clearance between the brake drum and the movable brake shoes or bands. This volume of oil may be termed the "clearance volume." The injection device of this invention may therefore supply any desired portion of this "clearance volume" to cause a quicker building up of pressure in the high pressure line and therefore a quicker application of the brakes after the actuation of the servo-pump control means.

A more specific object of the invention is to provide a simple, reliable, and efficient form of mechanism for carrying out the above stated functions.

Another object is to provide a branched high pressure line, one branch leading to the rear wheel brakes and the other branch leading to the front wheel brakes, and means for automatically cutting off either branch in case of a leak therein in order to permit the proper functioning of the second branch.

Further objects and advantages of the present invention will be apparent from the following description, reference being had to the accompanying drawings, wherein a preferred form of embodiment of the present invention is clearly shown.

In the drawings.

In the drawings like or similar reference characters refer to like or similar parts throughout the several views.

Figure 1:
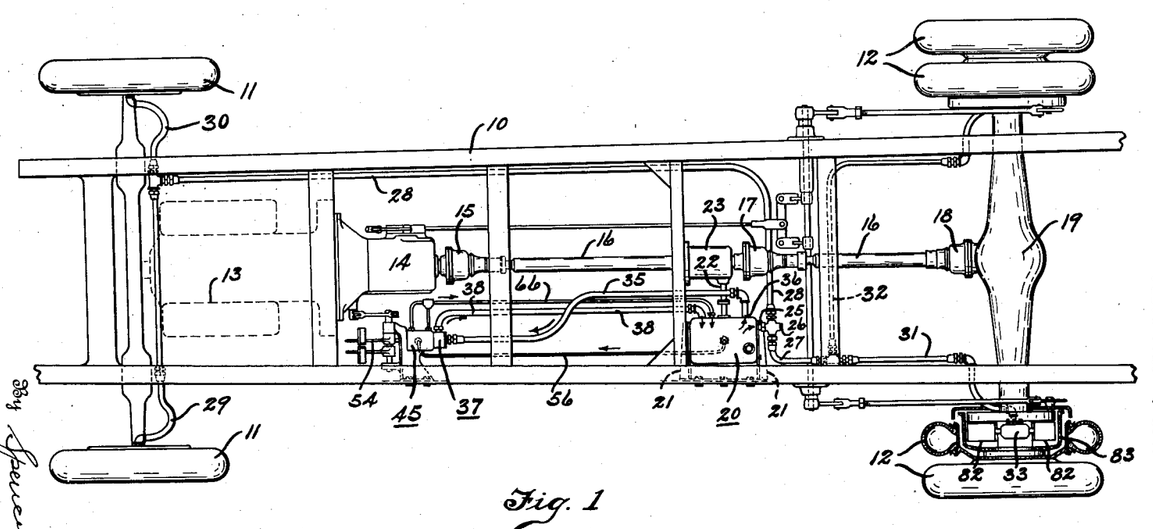
Fig. 1 is a plan view of an automotive vehicle chassis equipped with the hydraulic brakes of this invention. The brake mechanism is somewhat enlarged and somewhat diagrammatically shown for the sake of clearness of illustration.

In Fig. 1 numeral 10 designates the chassis frame, 11 the front road wheels, 12 the rear driving wheels and 13 the gasoline engine for driving the rear wheels through the transmission 14, universal joint 15, propeller shaft 16 having the universal joints 17 and 18 therein, and the well known differential and rear axle construction contained in the rear axle housing 19. All these parts may be of any suitable construction and are well known in the art, therefore no detailed description or illustration thereof are deemed necessary.

A servo-pump 20 is shown in Fig. 1 rigidly mounted upon suitable brackets 21 which are firmly bolted or otherwise secured to the chassis frame 10. This pump 20 is driven by the short transverse shaft 22 which is suitably geared to the propeller shaft 16 through bevel gears or any other suitable gears enclosed in the box 23. This pump 20 is illustrated in detail in Figs. 9 to 13 inclusive and will be described in greater detail hereinafter.

A high pressure line leads from the pump delivery outlet at 25 into an automatic shut off valve 26 provided with two branches 27 and 28. Branch 28 leads to the front axle where it is again divided into two branches 29 and 30 leading respectively to the left and right front wheel brake cylinders. Branch 27 is divided into the two branches 31 and 32 which lead respectively to the left and right rear wheel brake cylinders 33. Each of these branches is provided with a flexible section of suitable length adjacent the brake cylinders, as clearly illustrated in Fig. 1, to allow for the relative movement between the brake cylinders and the rigid parts of the chassis frame, as will be well understood.

A second line 35 leads from the pump delivery outlet 36 to the by-pass valve 37 and thence back to the pump through line 38. This by-pass valve 37 is normally open and permits relatively free circulation of oil from the pump delivery through ducts 35 and 38 and hence at such times the pump 20 does not build up a high pressure in the high pressure lines 27 and 28 such as to actuate the brake cylinders 33. When however this by-pass valve 37 is closed or partially closed by the operator, as will be presently described, the pump 20, which is continually running so long as propeller shaft 16 is turning, will immediately build up a high pressure in duct 35 and in the high pressure lines 27 and 28 and therefore actuate the brake cylinders 33 on all four wheels and apply the brakes.

Figure 2:
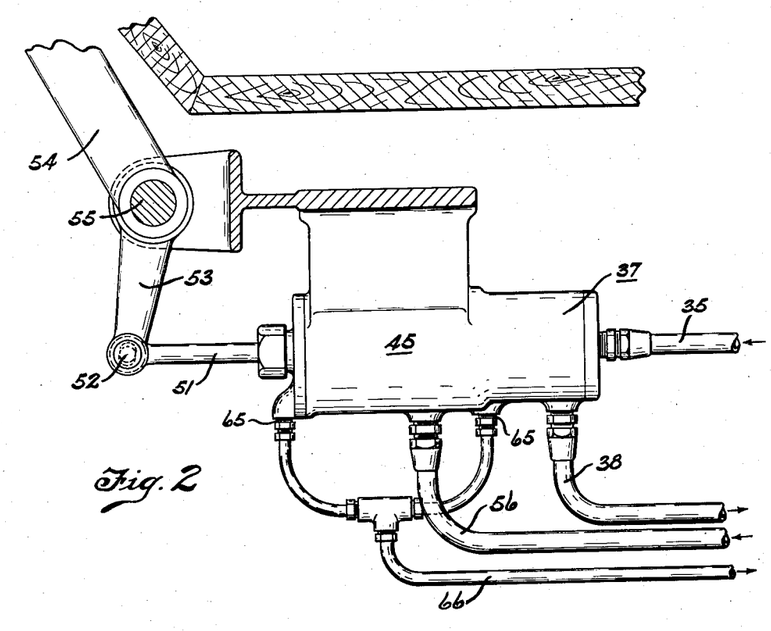
Fig. 2 is a side elevation of the manually operated by-pass control for the servo-pump and the injection device. The upper portion of the brake pedal is broken away.
Figure 3:
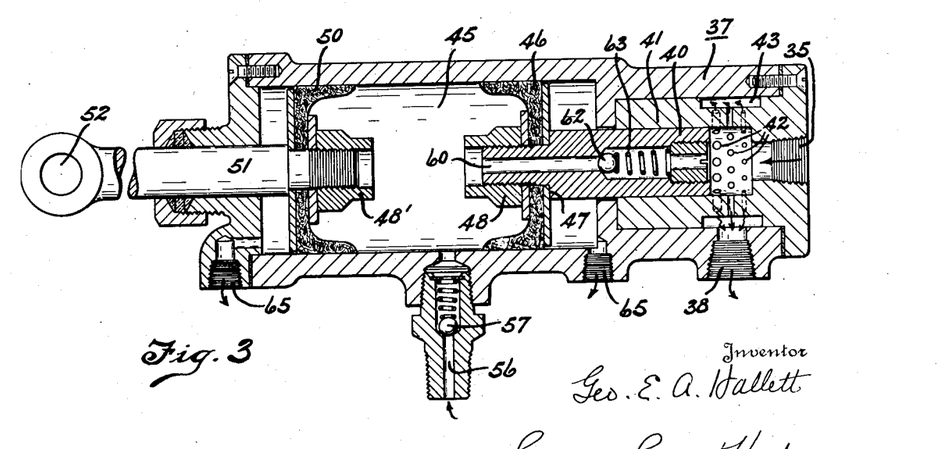
Fig. 3 is an enlarged vertical section through the by-pass valve and injection device of Fig. 2.

Figs. 2 and 3 show the by-pass valve 37 and the means for operating the same on an enlarged scale. The valve 37 comprises a valve plunger 40 which is reciprocable within the valve cylinder 41 to progressively close the valve ports 42 and thus restrict the passage through the by-pass valve progressively. The annular space 43 around the outside of ports 42 is in free communication with the return duct 38 as clearly shown in Fig. 3. The valve plunger 40 extends into the oil pressure cylinder 45 and is attached to a piston 46 in said pressure cylinder 45 by means of a shoulder 47 on the plunger and a nut 48 threaded to the outer end thereof. A similar piston 50 is mounted in the opposite end of cylinder 45 and in opposed relation to piston 46. Also piston 50 is similarly attached to an operating piston rod 51 which extends out through the opposite end of cylinder 45. The outer end of rod 51 is pivoted at 52 in an elongated slot in the lower arm 53 of the foot pedal lever 54. The foot pedal lever 54 is pivoted upon the stationary pivot 55 which may be supported by the bracket upon which cylinder 45 is mounted, as clearly shown in Figs. 1 and 2. Oil is supplied to cylinder 45 through refill duct 56 which leads from the oil reservoir in pump 20. This refill duct 56 is provided with a check valve 57 which prevents the escape of oil from cylinder 45 when piston 50 is moved to the right (as seen in Fig. 3) by the operator pressing on the pedal lever 54. It will now be clear that when the operator depresses the foot lever 54 the piston 50 will compress the oil between the pistons 50 and 46 in cylinder 45 and therefore move piston 46 to the right thus causing valve plunger 40 to progressively close the valve ports 42 according to the distance through which foot lever 54 is moved. The pressure built up by pump 20 in duct 35 due to the partial closing of by-pass valve 37 is of course the same as that built up in the high pressure lines 27 and 28 leading to the brake cylinders 33. This pressure in duct 35 acts upon the end area of valve plunger 40 and hence acting back through pistons 46 and 50 and the oil therebetween opposes the downward movement of the foot lever 54. It will therefore be clear that the resistance to the braking movement of foot lever 54 will be proportional to the braking force exerted by the braking cylinders 33 upon the brake shoes. The operator is thus enabled to feel with his foot the amount of braking effort exerted upon the brake shoes even though this braking effort is supplied by the servo-pump 20. This is an obvious advantage since the brakes are applied and released in a manner corresponding to that in which the ordinary foot operated mechanical brakes are actuated. The ratio of the resistance to the braking movement of foot lever 54 to the force actually exerted at the brake shoes is determined by the end area of valve plunger 40 and hence this ratio may be given any desired value by choosing the proper diameter of plunger 40. A ratio of one to ten has been found suitable for braking systems on large busses but of course a different ratio may be found desirable in different cases and the invention is not limited to any particular ratio.

The injection device for overcoming the lag in the application of the brakes will now be described. The valve plunger 40 is provided with a duct 60 leading from the oil space between pistons 46 and 50 through the plunger and a ball check valve 61 held upon its seat by spring 62 is provided therein, all as clearly shown in Fig. 3. Now when piston 50 is moved to the right by the operator depressing foot lever 54, piston 46 moves to the right to close off some or possibly all of the valve ports 42, as above described, and also some of the oil between pistons 46 and 50 is injected through check valve 62 into the duct 35 and thereby aids the pump 20 in more suddenly building up high pressure in all the high pressure lines, namely, duct 35, ducts 27 and 28 and their respective branches, and the brake cylinders located at the brake drums on the four wheels. As soon as the brake plungers in the brake cylinders are moved a sufficient distance to take up the clearance between the brake shoes and brake drums the pressure is built up in the high pressure lines and this immediately causes the closing of check valve 62 as will be readily understood. Thereafter the pressure in duct 35 acts against the total end area of the valve plunger 40 to resist the downward movement of foot lever 54 as above described. It is thus seen that part of the "clearance volume" of oil for the brake cylinders is pumped into the high pressure lines manually before the pressure is built up to a high value and therefore only a small amount of work is required to do this manual pumping.

The foot lever 54 when released is returned to its normal position by a suitable spring (not shown) which will of course cause piston 50 to move to the left end of cylinder 45 (as viewed in Fig. 3). When piston 50 moves to the left oil will enter cylinder 45 from the refill duct 56 past the check valve 57. Therefore the cylinder 45 will remain full of oil at all times. A certain amount of leakage which may take place past the pistons 46 and 50 is carried back to the oil reservoir of pump 20 through the drain ports 65 and the drain duct 66.

If by any chance the cylinder 45 should fail to refill due to any cause whatever the valve plunger 40 may still be operated by foot lever 54 by providing a sufficiently long movement to rod 51 that the nut 48' on its inner end will engage the nut 48 on the end of the valve plunger 40 and so actuate the same. This provides an important safety feature since the valve plunger 40 may thus be operated mechanically in the event of failure of the oil system of cylinder 45.

Figure 4:
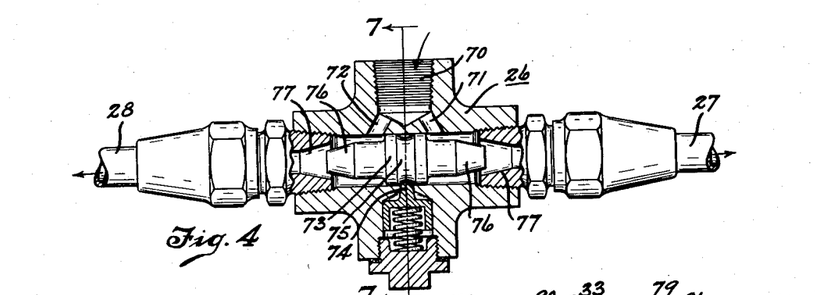
Fig. 4 is an enlarged section through the automatic valve for closing off either branch of the high pressure line which may spring a leak.
Figure 7:
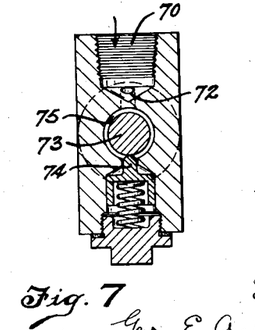
Fig. 7 is a section on line 7—7 of Fig. 4.
Figure 8:
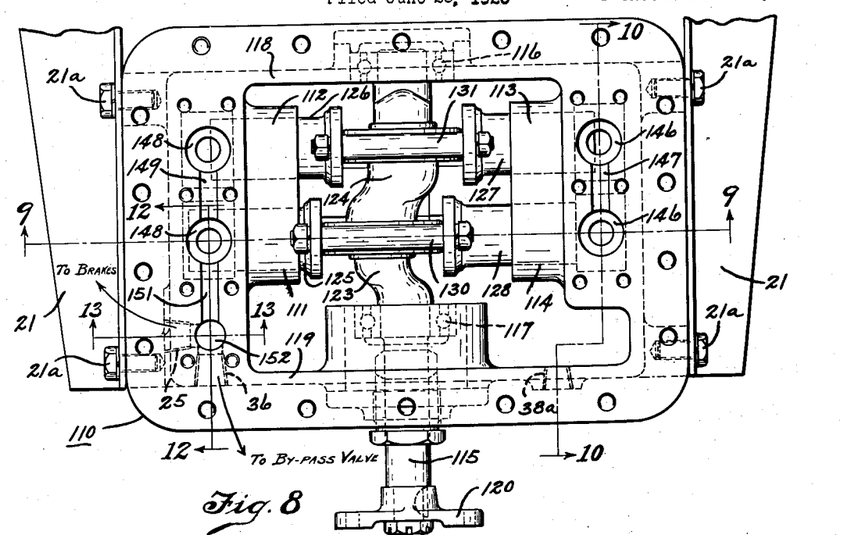
Fig. 8 is a plan view of the servo-pump with the top cover, the oil duct connecting the two outlets of the opposed cylinders, and the oil baffle plate removed.

The automatic shut off valve 26 for closing off one or the other of the high pressure lines 27 or 28 in case of a leakage therein will now be described (see Figs. 4 and 7). The body of the valve 26 is in the form of a T pipe coupling as clearly illustrated. Oil from the pump 20 enters the valve body at the pipe connection 70 and divides and flows through the two slightly restricted ducts 71 and 72. The double acting valve piston 73 is normally held in a position between the two ducts 71 and 72 by means of the spring pressed detent 74 which engages an annular groove 75 in piston 73. This piston is provided on each end thereof with a tapered valve 76 which is adapted to fit snugly within a tapered valve seat 77. The high pressure branches 27 and 28 are connected to the opposed valve seats 77 as clearly shown in Fig. 4. During normal operation of the braking system the piston 73 remains centered between the ducts 71 and 72 thus permitting oil to flow to each of the branches 27 and 28. If however a serious leak occurs in either one of the branches 27 or 28 such as to cause the oil pressure in that branch to fall, the oil pressure upon the opposite side of the piston 23 will overcome the lowered pressure on the side of the leaking branch and snap the piston 23 over and tightly wedge the tapered valve 76 upon its seat and thus close off the leaking branch from the pump 20. This is an important safety feature since a leak in the branch leading to one pair of wheels will not interfere with the proper operation of the brakes on the other pair of wheels.

It will be observed also that when one of the valves 76 is wedged into its seat 77, the spring pressed detent will be engaged on the outside of one of the shoulders forming the groove 75. This action of the detent will prevent the opening of the passage to the leaky pipe when the brake is released. This feature is especially important in a hydraulic system since it prevents a little loss of liquid with each application of the brake.

Figure 5:
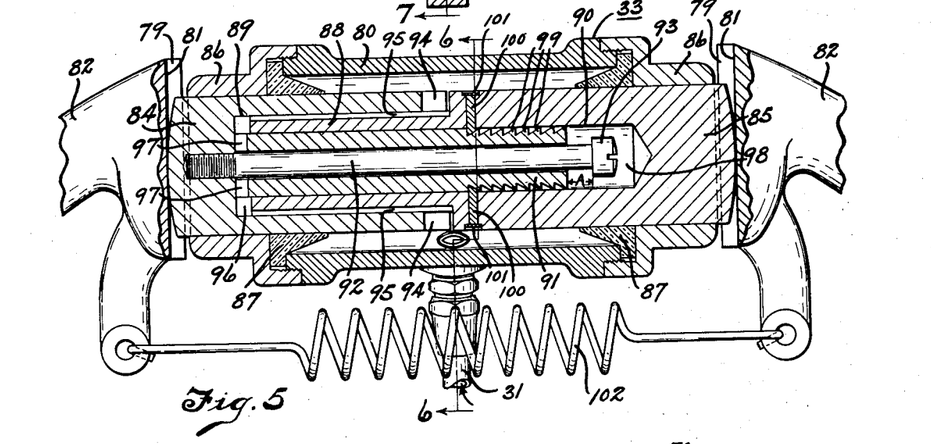
Fig. 5 is a section through the brake operating cylinder located at the brake drums on the road wheels.
Figure 6:
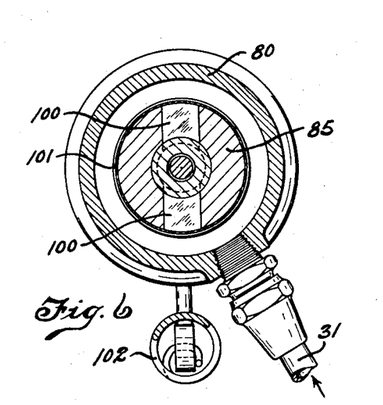
Fig. 6 is a section on line 6—6 of Fig. 5.

Any suitable hydraulic brake cylinder mechanism may be used with the brake system above described. In Figs. 5 and 6 however there has been illustrated in detail a form of brake cylinder which is preferred. Numeral 33 designates the brake cylinder mechanism in its entirety. The cylinder 80 is stationary and is suitably mounted directly between the opposed pressure faces 81 of the two brake shoes 82 which are pivotally mounted within the brake drum 83 (see Fig. 1) in a well known manner. The two brake plungers 84 and 85 extend through the opposite cylinder heads 86 which are threaded upon the cylinder 80. A suitable cup packing 87 for preventing leakage of oil past the plungers 85 is provided at each end, which packing 87 also serves as a suitable gasket between the cylinder 80 and cylinder heads 86 threaded thereupon. The plunger 85 is provided with an extension 88 of reduced diameter which telescopes within a corresponding bore 89 in plunger 84. The plunger 85 is also provided with a central bore 90 in which is slidably fitted a tubular ratchet member 91. A long screw 92 having an enlarged head 93 extends quite loosely through ratchet member 91 and is threaded into plunger 84. The distance "A" between the screw head 93 and the end of ratchet member 91 limits the relative sliding movement between the plunger 84 and ratchet member 91, as is clearly shown in Fig. 5.

In applying the brakes, oil enters the cylinder 80 through the high pressure duct 31 and is forced in between plungers 84 and 85 at the recesses 94 and thence along longitudinal grooves 95 on the surface of the extension 88 into the annular space 96. From space 96 the oil passes through suitable notches 97 cut in the end of tubular ratchet member 91, and thence around the loosely fitting screw 92 to the cylindrical space 98. It will now be obvious that the oil pressure acts upon the total cross sectional area of the two plungers 84 and 85 and will force them apart, thus expanding the brake shoes 82 against the brake drums. The projecting ends of the brake plungers 84 and 85 are cut away at each side thereof to form vertical flats thereon. These flatted sides of the plungers 84 and 85 cooperate with side flanges 79 on each side of the faces 81 of brake shoes 82 to prevent rotation of the plungers within the brake cylinder. Since both plungers are held against rotation the recesses 94 in plunger 85 will remain at all times in register with the oil passage grooves 95 in plunger 84. Fig. 5 shows the plungers in non-expanded position. After the plungers have been forced apart the distance "A" the screw head 93 will engage the end of ratchet member 91. This travel "A" is made only sufficiently great to permit the required movement of the brake shoes 82 for their proper braking and loose positions. Now when the brake linings wear down, the brake shoes 82 obviously must move out slightly further in order to apply the brakes and in such event the screw head 93 will engage and move the ratchet member 91 such additional movement required by the amount of wear which has taken place. This ratchet member 91 is provided with a series of circular ratchet teeth 99 with which the two ratchet pawls 100 engage. These pawls 100 are held yieldably pressed down in suitable radial slots in plunger 85 by means of the circular spring band 101 which lies in a suitable annular groove on the periphery of plunger 85. Now when ratchet member 91 is moved by the screw head 93 a distance equal to that between two of the ratchet teeth 99 the pawls 100 will snap into the next succeeding notch. Then when the brakes are loosened by the operator the plungers 84 and 85 are returned to their closed position by the spring 102, as will be readily understood by those skilled in the art, but they will not telescope upon one another quite so far as before since the ratchet member 91 will be held by the pawls 100 in its new position one notch further to the left (as seen in Fig. 5). Therefore when the brakes are next applied the plungers will not have so far to move before the brakes are tightened and hence the brakes may be applied more suddenly since less oil is required at each brake cylinder before the brake shoes are tightened upon the brake drums. Preferably a sufficient number of ratchet teeth 99 are provided on ratchet member 91 to take up the slack due to the wearing down of the brake linings until the linings are worn out and require replacement. At the time of such replacement the ratchet member 91 should be set back in the position shown in Fig. 5 in which the pawls 100 engage in the first ratchet notch.

Any suitable servo-pump may be used with the brake system above described, however there has been illustrated in more or less detail in Figs. 8 to 13 inclusive a form of pump which is especially adapted for providing the hydraulic power for applying the brakes of this braking system. The four pump cylinders 111, 112, 113, and 114 are arranged as clearly shown in Figs. 8 and 9 and are preferably an integral casting which is designated as a whole by numeral 110. The crank shaft 115 is supported on two ball bearings 116 and 117 which are mounted upon the side walls 118 and 119 of the box-like casting 110 as clearly shown in Figs. 8 and 11. The crank shaft 115 projects through the side wall 119 and is provided with a shaft coupling member 120 by means of which it is coupled to and driven by the drive shaft 22 (see Fig. 1). A suitable stuffing box 121 is provided where shaft 115 projects through the wall 119 to prevent escape of oil at this point. The ball bearing 116 in the opposite wall 118 is covered by a suitable cover plate 122 whereby the escape of oil at that end is entirely prevented. The crank shaft 115 has two throws 123 and 124 at 90 degrees apart for reciprocating the four pistons 125, 126, 127 and 128. The opposed pistons 125 and 128 are rigidly connected together by the Scotch yoke 130 which is reciprocated by the crank throw 123 through a suitable ball bearing 132. The opposed pistons 126 and 127 are similarly connected together by the Scotch yoke 131 which is driven by the crank throw 124 through the ball bearing 133. The shape of the cam plates of the Scotch yokes 130 and 131 is clearly illustrated in Fig. 11. The bolts 134 rigidly hold the opposed cam plates in spaced relation. The two bottom bolts 134 are loosely guided against lateral movement by the guide plates 135 (see Fig. 11) which are rigidly supported in place by the bracket 136 which is bolted to the cylinder block casting 110, as clearly shown in Fig. 9. These guide plates 135 therefore hold the two Scotch yokes 130 and 131 in their vertical positions at all times and thus prevent them from rotating about the center lines of the pistons and interfering with one another, all as will be obvious from the drawings.

Figure 9:
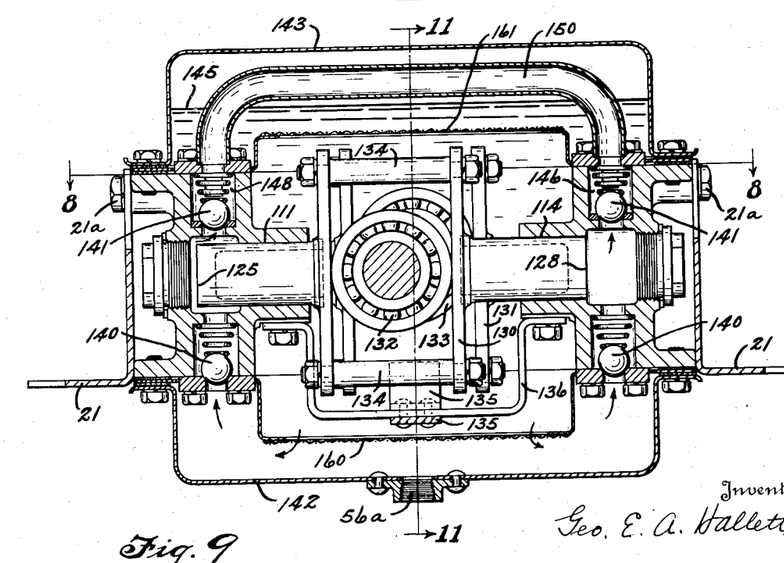
Fig. 9 is a vertical section through the servo-pump on line 9—9 of Fig. 8.
Figure 10:
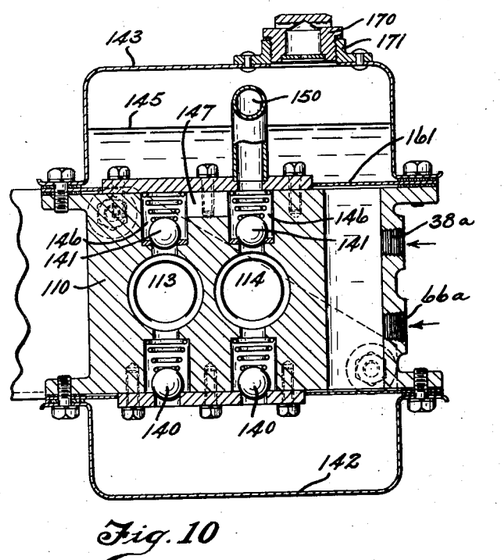
Fig. 10 is a vertical section on line 10—10 of Fig. 8.
Figure 11:
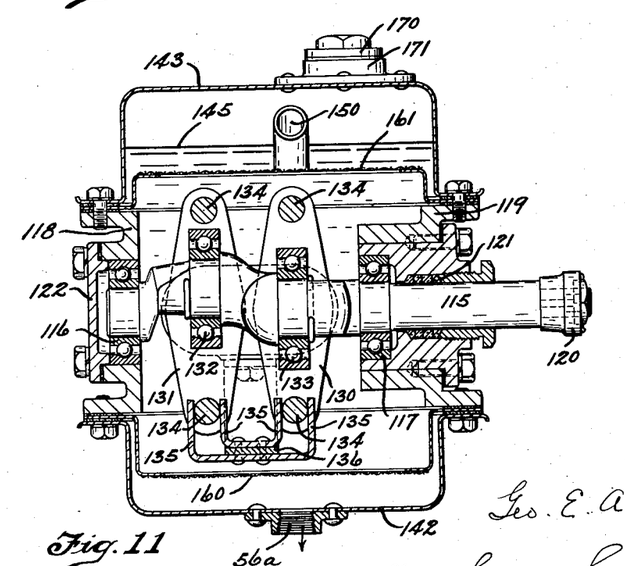
Fig. 11 is a vertical section on line 11—11 of Fig. 9.
Figure 12:
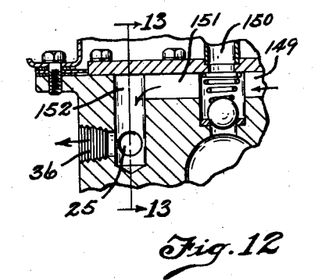
Fig. 12 is a vertical section on line 12—12 of Fig. 8 and shows the branched delivery port of the servo-pump.
Figure 13:
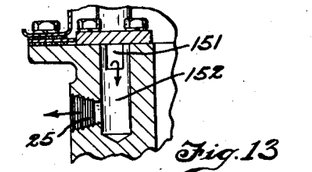
Fig. 13 is a section on line 13—13 of Figs. 8 and 12.

Each of the pump cylinders is provided with a spring pressed ball check inlet valve 140 and a similar outlet valve 141. The open bottom of the box-like casting 110 is closed by the bottom cover plate 142 and the otherwise open top of casting 110 is closed by the top cover plate 143, each cover plate being securely bolted to the casting 110 with a suitable gasket inserted in place between the contacting surfaces to provide an oil tight joint. The entire interior of casting 110 therefore serves as an oil reservoir and is kept filled with oil approximately at the level 145 as shown in Figs. 9, 10 and 11. The outlet passages 146 of the two cylinders 113 and 114 are connected through the intercommunicating passage 147, these passages being preferably recessed in the casting 110, as clearly shown in Figs. 8, 9 and 10. The outlet passages 148 of the two cylinders 111 and 112 are similarly connected through the passage 149. A communicating duct 150 extends from the passage 147 to the passage 149, thus connecting the outlets of all four cylinders to the passage 149. This passage 149 has an extension passage 151 which leads into the vertical bore 152 (see Figs. 8, 12 and 13) which will hereinafter be termed the pump delivery passage 152, since the oil from all four of the pump cylinders is led through the various passages above described to this delivery passage. This delivery passage 152 has two outlet ports 25 and 36 branching therefrom. The duct 35 leading to the by-pass valve 37 is attached at port 36, while the high pressure line leading to the automatic shut off valve 26 and thence to the brake cylinders is attached at port 25. In Fig. 1 the automatic shut off valve 26 is shown attached to the outlet port 25 by a short pipe nipple, but obviously the automatic valve 26 may be located at any position in the high pressure line found convenient.

An oil filtering screen 160 is preferably arranged in the bottom part of the oil reservoir, as clearly shown in Figs. 9, 10 and 11, through which all the oil entering the pump inlet valves 140 must pass. By this means the oil which is continuously circulated through the by-pass valve 37 is kept clean and free of dirt particles.

A screen or perforated baffle plate 161 is arranged in the top part of the oil reservoir above the reciprocating mechanism but below the oil level to prevent said mechanism from so disturbing the free surface of the oil level as to cause air bubbles to become mixed with the oil. It is very important that the oil be kept entirely free of air bubbles since if they once get into the high pressure lines the quick operation of the brakes is seriously interfered with. The baffle plate 161 is preferably clamped in place between suitable gaskets between the contacting surfaces of the top cover 143 and the top of casting 110. The screen 160 is preferably held in place in a similar manner between the bottom cover plate 142 and casting 110, both as clearly disclosed in Figs. 9, 10 and 11. The by-pass return pipe 38 is connected to the oil reservoir in pump 20 at the pipe threaded opening 38ª, and the drain pipe 66 leading from the injection device 45 is connected at the pipe threaded opening 66ª (see Fig. 10). The refill duct 56 for conducting oil from the reservoir to the injection device 45 is connected below the filtering screen 160 at 56ª. It is thus seen that all oil which flows into the oil reservoir must pass through the screen 160 before it again leaves the reservoir either through the pump cylinders or through the injection device 45.

A suitably vented filler plug 170 for the oil reservoir is screw threaded into the threaded boss 171 riveted to the top cover plate 143. Since all the moving parts of the pump are immersed in oil at all times thorough lubrication is at all times provided. Preferably an oil level gage (not shown) is provided so that the operator will always know that the oil level is high enough to insure the proper operation of the hydraulic system. The pump 20 may be rigidly supported upon the chassis frame by the mounting brackets 21 which are rigidly bolted to the pump casting 110 by suitable bolts 21ª.

The operation may be briefly described as follows. When the pedal 54 is depressed piston 50 moves toward the right as shown in Figure 3. The liquid in chamber 45 acts as a transmitting medium for causing a similar movement of piston 46. Should the liquid fail in its duty parts 48 and 48' contact to insure the movement of piston 46. Movement of piston 46 causes valve 40 to wholly or partly close the openings 42 and check the flow of fluid through the normally open by-pass through which the pump is circulating it. Pressure is thereby built up and fluid passes out through opening 25, valve 26, and to the several brakes. Should there be a leak at any one of the brakes, valve 26 serves to cut out the brakes at one pair of wheels and leaves the remainder of the braking system operative. The auxiliary device comprising valve 62 permits fluid in chamber 45 to be discharged into the brake operating fluid and serves to take up for any lag due to the brake shoe clearance. Upon release of the pedal fluid may enter chamber 45 through valve 57. Leakage around the pistons is carried back to the oil pump reservoir by the duct 66.

While the form of embodiment of the present invention as herein disclosed, constitutes a preferred form, it is to be understood that other forms might be adopted, all coming within the scope of the claims which follow.

What is claimed is as follows:

1. In a hydraulic braking system for vehicles, in combination, a servo pump, a duct leading from the delivery to the intake of said pump, a by-pass valve in said duct, means for closing said valve and thereby causing a pressure to be built up at the pump delivery, a hydraulic brake cylinder, a pressure line leading from said pump delivery to said brake cylinder, and injection means operated concomitantly with the closing of said valve for injecting fluid into the pressure line to cause the pressure therein to be built up more suddenly.

2. In a hydraulic braking system for vehicles, in combination, a servo pump, a duct leading from the delivery to the intake of said pump, a by-pass valve in said duct, means for closing said valve and thereby causing a pressure to be built up at the pump delivery, a hydraulic brake cylinder, a pressure line leading from said pump delivery to said brake cylinder, and injection means for injecting fluid into the pressure line immediately upon the partial closing of said by-pass valve.

3. In a hydraulic braking system for vehicles, in combination, a servo pump, a duct leading from the delivery to the intake of said pump, a by-pass valve in said duct, means for closing said valve and thereby causing a pressure to be built up at the pump delivery, a hydraulic brake cylinder, a pressure line leading from said pump delivery to said brake cylinder, and injection means for injecting fluid into the pressure line at the time of closing said by-pass valve.

4. In a hydraulic braking system for vehicles, in combination, a servo pump, a duct leading from the delivery to the intake of said pump, a by-pass valve in said duct, means for closing said valve and thereby causing a pressure to be built up at the pump delivery, a hydraulic brake cylinder, a pressure line leading from said pump delivery to said brake cylinder, and injection means for injecting fluid into the pressure line at the time of closing said by-pass valve, said injection means and said by-pass valve being operated by common operating means.

5. In a braking system, in combination, a servo pump, a duct leading from the pump delivery to the pump intake, a by-pass valve in said duct for restricting the passage therethrough, fluid pressure means for operating said by-pass fluid pressure means for operating said by-pass valve, a fluid brake cylinder, a pressure line leading from said pump delivery to said brake cylinder, and an injection valve permitting fluid to pass from said fluid pressure means into said pressure line to cause a sudden building up of pressure therein when said fluid pressure means is actuated.

6. In a hydraulic braking system, a servo-pump, having a duct leading from the pump delivery to the pump intake, means for restricting the passage through said duct comprising a piston type valve in said duct, fluid pressure means for operating said valve, a valve duct leading through said piston valve from said fluid pressure means to the pump delivery side of said piston valve, and a non-return valve in said valve duct.

7. In a hydraulic braking system, a servo pump, a duct leading from the delivery to the intake of said pump, including a valve cylinder, a valve therein, a pressure cylinder, a piston adjacent one end of the pressure cylinder and connected to the valve in said valve cylinder, a second piston in said pressure cylinder, manually operable means to actuate the second piston, means affording communication for fluid from the pump reservoir to the space between said pistons.

8. The invention set forth in claim 7, together with conduits to retsore to said pump fluid escaping around said pistons.

9. The invention set forth in claim 7, together with means associated with said pistons for engagement and operation of said valve in the event of loss of fluid medium between said pistons.

In testimony whereof I hereto affix my signature.

GEORGE E. A. HALLETT.